Oct. 23, 1973  M. H. ROBIN  3,767,742
PROCESS OF INJECTION MOULDING A HINGED ARTICLE HAVING
FOAM CORED MEMBERS JOINED BY AN UNFOAMED HINGE
Original Filed July 24, 1968

INVENTOR
MAURICE HENRY ROBIN

By
Cushman, Darby & Cushman
ATTORNEYS

United States Patent Office 3,767,742
Patented Oct. 23, 1973

3,767,742
PROCESS OF INJECTION MOULDING A HINGED ARTICLE HAVING FOAM CORED MEMBERS JOINED BY AN UNFOAMED HINGE
Maurice Henry Robin, Alderley Edge, England, assignor to Imperial Chemical Industries Limited, London, England
Continuation of abandoned application Ser. No. 747,328, July 24, 1968. This application Nov. 30, 1970, Ser. No. 93,917
Claims priority, application Great Britain, July 26, 1967, 34,400/67; Apr. 30, 1968, 20,470/68
Int. Cl. B29d 9/00, 27/00; B32b 7/02
U.S. Cl. 264—45
5 Claims

ABSTRACT OF THE DISCLOSURE

A method of forming a hinged article which comprises, injecting an unfoamable polymeric material into a mould cavity, subsequently injecting a foamable polymeric composition into the mould, enlarging the mould cavity except at the hinge defining component of the mould to cause foaming except in the area of the hinge defining component and allowing the material to set to form two foam cored members connected by a hinge of unfoamed material.

---

This application is a continuation of Ser. No. 747,328, field July 24, 1968, now abandoned.

This invention relates to improvements in or relating to hinged articles.

According to the present invention we provide a hinged article comprising at least two members each having a foamed core of a composition containing a thermoplastic polymeric material integrally formed with solid surface layers of a composition containing a thermoplastic polymeric material and each member being joined to at least one other foam cored member by an integrally formed hinge of substantially nonfoamed material. These articles may be made by an injection moulding process comprising injecting a moulding composition containing a thermoplastic polymeric material, at least part of the moulding composition injected being a foamable composition containing a thermoplastic polymeric material and a blowing agent, at a temperature above the activation temperature of the blowing agent, into a mould provided with a pair of opposed mould surfaces against which the desired non-foamed surface layers are to be moulded to form the foam cored members and with a hinge defining mould component positioned so as to form a flexible thin hinge of a substantially nonfoamed material between the desired foam cored members, causing nonfoamed surface layers of the moulding composition to be formed against said opposed surfaces, causing a foamed core to be formed between said nonfoamed layers, and thereafter cooling the moulded article to a temperature below the activation temperature of the blowing agent and below the softening point of the thermoplastic polymeric materials and removing the moulded article from the mould, said hinge defining mould component being arranged to substantially destroy, or prevent the formation of, any foamed structure along the line of the desired hinge.

In one method of operating this type of process all of the moulding composition consists of a foamable composition and the core of the foamable composition is allowed to expand while at least two opposing surfaces of the foamable composition are constrained so that no foaming takes place at these surfaces.

This method of operation is hereinafter termed the "one-shot" process.

The surfaces of the thermoplastic material may be constrained in any suitable manner. For example the opposed mould surfaces against which the non-foamed surface layers are moulded may be maintained at a temperature below the activation temperature of the blowing agent so that any material which contacts these surfaces will not become foamed.

A preferred method of constraining the surfaces is by the use of a mould arranged so that the opposed mould surfaces are capable of movement away from each other to a predetermined extent so as to enlarge the mould cavity, the mould surfaces being held, for example by hydraulic pressure, against such movement during the filling of the mould cavity with the moulding composition so that foaming of the foamable composition is substantially prevented until the moulding composition has formed into the desired nonfoamed surface layers which will not foam on enlargement of the mould cavity, and then the mould cavity is enlarged by causing the opposed surfaces to move away from each other so that foaming of the core of the foamable composition between said nonfoamed surface layers can take place.

In this arrangement it is not essential that external cooling be supplied to the opposed mould surfaces because, providing they are restrained from moving apart for sufficient time for the surface layers to solidify, the mould cavity may then be enlarged to obtain a suitable foam cored member. The surfaces of the mould may be moved rapidly away from each other thus allowing rapid expansion of the core of the thermoplastic material; alternatively, the expansion of the mould may be controlled in which case foaming is gradual and results in a more uniformly foamed core. In a modified form of the above process the hinged foam cored articles are made by first injecting a predetermined amount of a nonfoamable composition containing a thermoplastic polymeric material into the mould cavity to form the non-foamed surface layers and then before the core of the non-foamable composition has solidified, injecting the foamable composition at a temperature above the activation temperature of the blowing agent into the mould cavity to form the foamed core between the non-foamed surface layers.

In this case the injection moulding machine must be arranged so that two different compositions can be injected sequentially.

There are several methods by which this later process, which is hereinafter termed the "two-shot" method, may be operated. One method uses a conventional injection moulding machine in which a predetermined amount of the non-foamable composition is introduced into the front of the barrel of the injection moulding machine and the foamable composition introduced into the barrel behind the non-foamable composition. This method, however, suffers from the disadvantage that if the process is operated repetitively, which is desirable, the second and subsequent shots of non-foamable composition are being introduced into a region of the barrel of the machine which already contains some of the foamable composition and so mixing of the two is liable to occur.

One method of overcoming this disadvantage is by injecting a further small quantity of non-foamable composition into the mould cavity after injecting the foamable composition. In this way the front of the barrel and the nozzle can be swept clean of the foamable composition at the end of the injection stroke so that non-foamable material free from contaminating foamable composition is left in the front of the barrel and nozzle for injection in the next moulding cycle.

A more convenient and preferred method is to use two injection barrels, both of which feed material into an injection nozzle which itself injects material into the mould. The operation of the machine is synchronised so that the required quantity of non-foamable composition is first introduced into the mould and then the required amount of the foamable composition is injected into the mould thereby emptying the nozzle so that a further quantity of non-foamable composition may be introduced into the mould in the next moulding cycle without it mixing with any of the foamable composition. Again the system can be programmed if desired to inject a small amount of nonfoamable composition at the end of the injection stroke to sweep the nozzle clear of the foamable composition. Alternatively, two injection moulding machines may be used, each of which injects material through separate nozzles into the mould, the timing of the operation of the machines being correlated so that the desired amount of non-foamable composition is first introduced into the mould and is then followed by the desired amount of the foamable composition. In some cases, the system may be programmed to advantage so that some foamable composition may be injected before all the non-foamable composition has been injected.

As in the case of the one-shot process, an enlargeable mould may be used. When using an enlargeable mould cavity with either the one-shot or two-shot process, the enlargement may be effected by instantaneously relieving the pressure holding the opposed surfaces of the mould together so that the pressure generated by the decomposition of the blowing agent forces the opposed surfaces of the mould apart and thus allows foamable composition to foam and expand to fill the enlarged mould cavity. Alternatively, the pressure holding opposed surfaces of the mould may be reduced slowly thereby allowing a controlled expansion of the mould. In either the one-shot process or the two-shot process, where an expanding mould is used, the expansion of the mould may be effected entirely by the pressure created by the decomposition of the blowing agent, or alternatively, external forces may be applied to assist enlargement of the mould cavity.

The surface of the moulds used in the present invention may be textured to impart any desired surface to the moulded article. For example, the mould surface may be smooth, grained, matt or have a regular pattern thereon so as to impart a corresponding surface finish to the unfoamed skin of the article. Alternatively the mould may be coated with a high temperature resistant material, for example, silicone rubber, to impart a desired surface finish.

We have found that by using the two-shot process the tendency for voids or sink marks to be formed in the surface of the article is reduced. Furthermore, with the two-shot process there is the added advantage that if pigments, fillers or other additives which improve the surface finish of the article are to be included in the moulding they need only be included in the non-foamable composition. This may result in considerable financial saving as smaller amounts of these additives or compositions containing them may be used and many of these additives are expensive. Examples of fillers may be included to improve the stiffness of the moulding include glass and asbestos fibres or glass and mica plates optionally coated with a resin to improve adhesion between the filler and the thermoplastic polymeric material. If desired, different additives may be included in the foamable and non-foamable compositions.

The amount of non-foamable composition that is injected into the mould will depend upon the size of the mould and the required thickness of the unfoamed surface skin.

Any suitable thermoplastic polymeric materials may be used in the production of hinged articles according to the present invention but naturally the actual material used will depend on the use envisaged for the article. For example, if the article is to be subsequently subjected to elevated temperature, such as those used in conventional painting and stoving techniques, the preferred thermoplastic polymeric materials are polypropylene, polyamides, polycarbonates, acrylonitrile-butadiene-styrene copolymers, polyacetals, polyphenylene oxides and polysulphones. Other materials such as polymers and copolymers of vinyl chloride, polyethylene and polymethyl methacrylate may be used providing the articles are used at lower temperatures.

On the other hand, if a somewhat flexible moulding is required, then a plasticised vinyl chloride polymer may be used.

The bolwing agents which may be used in this invention may be classified under two types. One suitable type includes the liquid blowing agents which may be absorbed by the thermoplastic polymeric material and which vaporise on heating thus foaming the composition; examples of suitable liquid blowing agents include methyl chloride, ethyl chloride, vinyl chloride, the polyhalocarbons and also volatile hydrocarbons such as pentane. The other type of blowing agent includes the solid blowing agents which decompose on heating to yield a gas, for example, solids such as sodium bicarbonate which yields carbon dioxide on heating and those which yield nitrogen on heating, for example, the organic compounds containing a N-nitroso-group, an azo-group or a hydrazo-group. Examples of this type of blowing agent are azodicarbonamide, dinitrosopentamethylene tetramine, p,p'-oxy-bis(benzene sulphonyl) hydrazide and benzene 1,3-disulphonyl hydrazide. By the "activation temperature" of a blowing agent we mean the temperature at which the gas or vapour which causes the foaming of the composition is released, that is, the boiling point of a liquid blowing agent or the decomposition temperature of a solid blowing agent. We prefer to use from 0.01% to 5% by weight of the total foamable composition of the blowing agent which may be incorporated into the composition in any suitable manner. For example, the thermoplastic polymeric material may be soaked in a liquid blowing agent which will thus be absorbed by the thermoplastic polymeric material. If, on the other hand, a solid blowing agent is used, it may conveniently be dry mixed with a powdered or granular thermoplastic polymeric material to obtain an intimate mixture. Alternatively, the blowing agent and the thermoplastic polymeric material may be hot compounded at a temperature below the activation temperature of the blowing agent, on, for example, a two-roll mill, or in an extruder, and the crepe or extrudate so obtained chopped, or diced to provide a suitable injection moulding composition.

In the two-shot method the thermoplastic polymeric material in the foamable composition may be the same as or different to the thermoplastic polymeric material in the non-foamable composition. Thus, it may be desirable in some cases to use a rigid polymer for forming the non-foamed surface layers and a flexible material, for example, a plasticised vinyl chloride polymer, to form the foamed core. Here again the amount of foamable composition that is used will be determined by the size of the mould and the required foam density.

The means forming the hinge of the article should be arranged so that foaming is prevented or minimised in the formation of the hinge so that the portion of the article constituting the hinge is substantially non-foamed. One method of effecting formation of the non-foamed hinge is by effecting controlled relative movement between the hinge defining mould component and one of the opposed mould surfaces in such a direction as to decrease the ratio of the distance between the hinge defining mould component and the other of said opposed surfaces to the distance between the two opposed mould surfaces.

For example the hinge defining mould component, which is preferably maintained at a temperature below the activation temperature of the blowing agent, may be forced against the non-foamed surface layers formed against the opposed mould surfaces while the foamable core between the non-foamed surface layers is permitted to foam in the regions on either side of the said hinge defining mould component, so that foaming along the line of the hinge is substantially prevented.

Another method, which may be utilised when an enlargeable mould cavity is employed, is to arrange the hinge defining mould component so that it remains at a constant distance from one of the opposed mould surfaces, the relative movement between the hinge defining mould component and said one opposed mould surface being effected by the predetermined movement of the opposed mould surfaces away from each other.

Another method of forming the hinge is by using a hinge defining mould component, heated to a temperature above the softening point of the foamable composition, which is forced against the moulding after foaming has taken place to compress and fuse the foamed core of the moulding along the desired line of the hinge. In this case therefore, relative movement of the hinge defining mould component and one of the opposed mould surfaces takes place to compress and fuse the foam core of the moulding between the hinge defining mould component and the other of the opposed mould surfaces.

In yet another method of forming the hinge, a piece of thin non-foamed flexible material is held between the hinge defining mould component and one of the opposed mould surfaces so that portions of said flexible material extend on either side of the hinge defining mould component so that the portions of the flexible material become embedded in the foam cored member formed on either side of said hinge defining mould component, leaving a middle portion of the thin flexible non-foamed material connecting the foam cored members as a hinge.

Suitable flexible hinge material include textile fabric and thin, flexible, sheets or films of a thermoplastic polymeric material. If a sheet or film of a thermoplastic polymeric material is used as the hinge piece, then the thermoplastic polymeric material may be of the same nature as that from which the foam cored members are made.

The invention is illustrated with reference to the accompanying drawings wherein FIG. 1 is a cross-section of a non enlargeable mould provided with a moveable hinge defining mould component.

Figure 1:
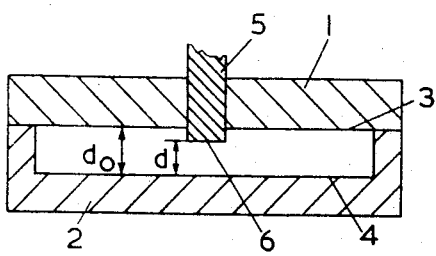

In FIG. 1 a mould is shown consisting of the mould components 1 and 2 defining a mould cavity having surfaces 3, 4 against which it is desired to form non-foamed surface layers. A hinge defining mould component 5 in the form of a bar is slideably mounted in mould component 1. A foamable composition is injected into the mould cavity through a nozzle (not shown) at a temperature above the activation temperature of the blowing agent in the foamable composition.

Figure 2:
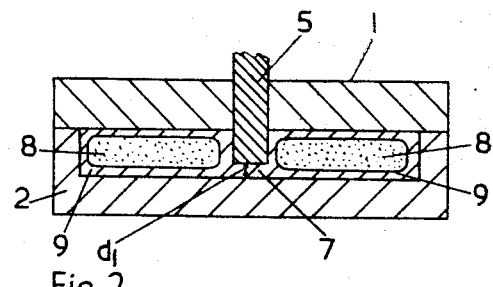
FIG. 2 is a cross-section of the mould of FIG. 1 after formation of the moulding.

Surfaces 3 and 4 are cooled to below the activation temperature of the blowing agent so that non-foamed surface layers are formed against these surfaces from the foamable composition while the remainder of the foamable composition foams to form a foam core between the non-foamed surface layers. The hinge defining mould component 5, heated to a temperature above the softening point of the foamable composition, is then forced towards surface 4 to the position shown in FIG. 2, compressing the foam cored article formed between the end 6 of the component 5 and surface 4, and fusing the thermoplastic polymeric material in the foam composition to a thin non-foamed mass so as to form a hinge 7 between the foam cored members on either side of the component 5. The foam core of the foam cored members is indicated by numeral 8 and non-foamed surface layers by numeral 9. Alternatively, the hinge defining component 5 can be moved towards surface 4, after formation of the non-foamed surface layers, so that the foamable composition between these surface layers in the space between the end 6 of the hinge defining mould component 5 and surface 4 is subjected to such pressure that foaming does not take place.

It is therefore seen, referring to FIG. 1, that the distance $d$ between the end of component 5 and the opposed mould cavity surface 4 is reduced to $d_1$ so that the ratio of $d$ to $d_0$, where $d_0$ is the distance between the opposed surfaces 3 and 4, is decreased.

Figure 3:
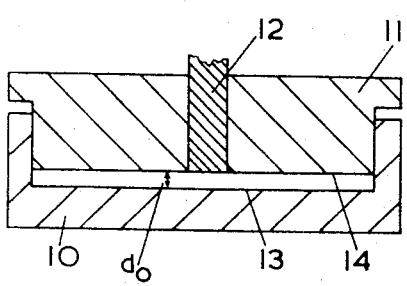
FIG. 3 is a cross-section of an enlargeable mould with a fixed hinge defining mould component.

In FIG. 3 a mould is shown wherein the mould components 10 and 11 are arranged to provide an enlargeable mould cavity. The hinge defining mould component, again in the form of a bar 12, is slideably mounted in mould component 11 but is held in fixed spatial relationship with mould component 10.

Figure 4:
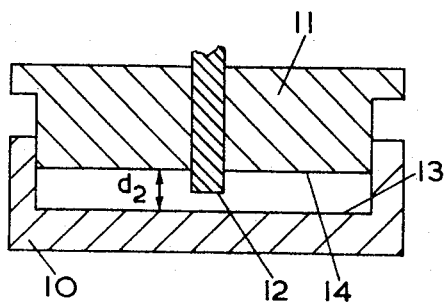
FIG. 4 is a cross-section of the mould of FIG. 3 after enlargement of the mould cavity.

In operation, a foamable composition is injected into the cavity at a temperature above the activation temperature of the blowing agent while mould component 11 is held in position relative to mould component 10 by hydraulic pressure sufficient to prevent foaming of the foamable composition, until nonfoamed layers of the thermoplastic composition have formed against the opposed mould cavity surfaces 13 and 14. The pressure holding mould component 11 in place is then relieved to permit component 11 to move away from mould component 10 thereby increasing the distance apart of surfaces 13 and 14 from $d_0$ to $d_2$. The enlarged mould is shown in FIG. 4. As the mould component 11 moves away from component 10, forming of the foamable core takes place between the non-foamed surface layers formed against surfaces 13 and 14. However, as the hinge defining component 12 does not move relative to mould component 10, the distance $d$ between the end 15 of the hinge defining component 12 and surface 13 remains constant and so foaming in the space between these components does not take place and so a thin flexible hinge is formed between the foam cored members formed on each side of the hinge defining mould component.

While in the arrangement described above the hinge defining component 12 is fixed relative to component 10, it will be appreciated that the mould can be arranged, if desired, so that the component 12 is moved relative to component 10 to give other hinge thicknesses.

Since the distance $d_0$ between surfaces 13 and 14 increases on enlargement of the mould cavity, the ratio of $d$ to $d_0$ is decreased.

The mould arrangements shown in FIGS. 1 to 4 can also be used in the two shot process wherein a non-foamable composition is first injected into the mould and forms the non-foamed surface layers against the mould surfaces 3 and 4 or 13 and 14 respectively. Before the central portion of this non-foamable composition has solidified, a foamable composition is injected and permitted to foam. In the case of the use of an enlargeable mould, as shown in FIGS. 3 and 4, foaming of the foamable composition takes place as the mould is enlarged.

Figure 5:
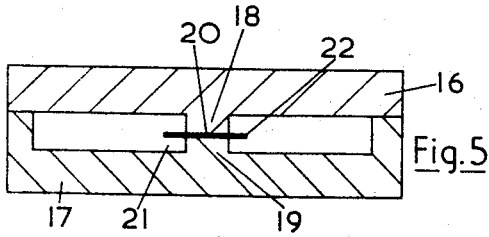
FIG. 5 is a cross-section of a non-enlargeable mould with a hinge defining mould component in the form of a clamp for a fabric hinge.

An alternative method of forming a hinge is shown in FIG. 5. Here a fixed, as opposed to an enlargeable, mould cavity is used, and is formed between mould components 16 and 17. A fixed hinge defining mould component is formed by a pair of projections 18, 19 on components 16 and 17 and these projections serve to clamp the middle portion 20 of a piece of fabric in the cavity so that portions 21, 22 of the piece of fabric extend into the cavity on either side of the hinge defining mould component. On formation of the foam cored members in the mould cavity on either side of the hinge defining mould component, by either the "one-shot" or "two-shot" methods set out above, the portions 21, 22 of the fabric become embedded in the foam cored members and on removal from the mould, portion 20 constitutes the hinge joining the foam cored members.

Figure 6:
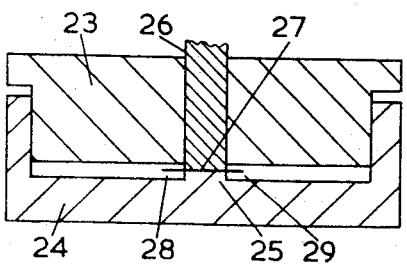
FIGS. 6 and 7 are cross-sections of an enlargeable mould, before and after enlargement thereof respectively, having a hinge defining mould component in the form of a clamp for a hinge of plastic film.
Figure 7:
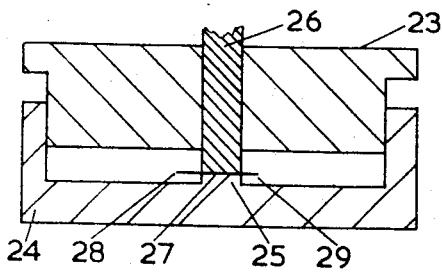

This method of hinge formation is also shown with reference to FIGS. 6 and 7 wherein an enlargeable mould cavity is formed by mould components 23, 24. The hinge defining mould component, in the form of a projection 25, extending from component 24 and a bar 26 slideably mounted in component 23 clamps the middle portion 27 of a piece of plastic film in the mould cavity having the end portions 28, 29 of the piece of film extending into the mould cavity on either side of the hinge defining mould component.

On formation of the foam cored members in the cavity on either side of the hinge defining mould component by either the "one-shot" or "two-shot" methods as set out above, the portions 28, 29 of the piece of film become embedded in the foam cored members. During enlargement of the mould cavity by movement of mould component 23 away from mould component 24, during which step foaming takes place, the bar 26 is held against the middle portion 27 of the piece of film so that none of the moulding composition can mould against this middle portion 27 of the piece of film.

While the hinged articles of the present invention may take many forms, the invention is particularly suited to the formation of blanks from which hollow articles may be formed by folding the blank along integrally formed hinges. Thus, we also provide according to the invention a blank capable of being folded to form a hollow object comprising foam cored members adapted to form a base, walls, and, if desired, a top of the object, in which neighbouring foam cored members are joined by integrally formed hinges of substantially non-foamed material.

In the production of such blanks, film or sheet flaps may be moulded into the blanks in such positions that, when the blanks are shaped into hollow articles, they may be used to seal the foam cored members of the blank together where the members are not connected by hinges. Conveniently, the flaps may be coated with an adhesive and the seal effected by heat-sealing.

Figure 8:
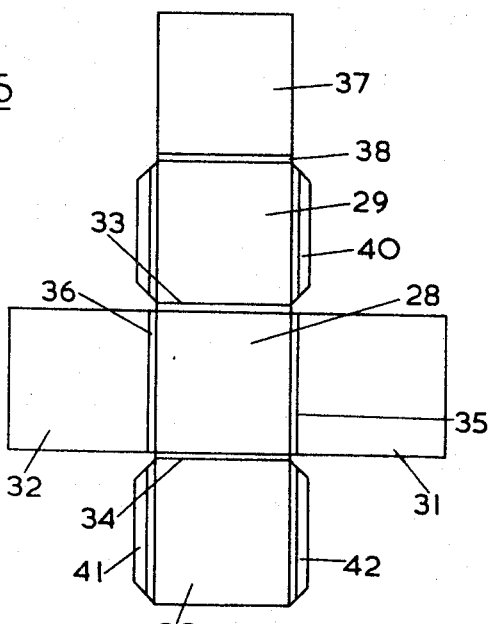
FIG. 8 is a plan view of a blank formed in accordance with the invention.

In FIG. 8 there is shown an example of a blank moulded from a foamable composition. This blank, which can be folded to form a box with a lid has a base piece 28, four wall pieces 29, 30, 31 and 32 connected to the base piece 28 by integrally formed non-foamed hinges 33, 34, 35, 36, and a lid piece 37 connected to wall piece 29 by an integrally formed non-foamed hinge 38. Small foam cored members 39, 40 and 41, 42 are formed along the opposite sides of wall pieces 29 and 30 respectively as flaps which can be used for fastening the wall members 31, 32 to the wall members 29 and 30 an assembly of the box from the blank. Instead of these flaps 39, 40, 41, and 42 being foam cored members, they may be made in a non-foamed manner during the moulding by preventing foaming over all the flap area instead of just along the hinge lines during the process.

Objects constructed in this manner from the blanks have the advantages of having a good strength to weight ratio and also the foam cores of the foam cored members provide insulating properties both to heat and cold and to sound.

Examples of hinged articles which may be made according to the present invention include book covers, tote bins, tea chests, fruit boxes, drawers, crates, tanks, for example, domestic water tanks, lavatory cisterns, sinks, cupboards, television and radio cabinets, letter boxes and a variety of other articles. Where a hollow object is constructed from a blank, the foam cored members may be assembled together in any suitable manner, although it will be appreciated that if containers for liquids are to be made, the joints between the edges of the foam cored members must be liquid tight. One convenient method of joining the foam cored members is by the use of heat sealable flaps, as mentioned above. Alternatively, or in addition, lugs may be formed in one foam cored member of the blank during the moulding, the lugs being positioned so as to interlock with recesses formed in the foam cored member which is to form an adjacent wall of the object, or the sides of the article may be bound or sealed together with strapping tape.

If desired, the moulds used may be shaped so as to provide ribs and bosses integrally moulded in the hinged article. Where the hinged article is a foldable blank these will improve the stiffness and rigidity of objects formed from the blanks and also provide positions at which attachments such as hinges, catches and locks may be attached to the hollow object formed from the blank.

By the manufacture of hinged articles according to the present invention, articles such as blanks may be formed flat and so their surfaces can be treated, for example, embossed or printed, far more readily than in the case of a "three-dimensional" object. Thus blanks for the formation of cabinets can easily be printed with a wood grain finish. Another advantage resulting from the use of a foam cored structure is that a cabinet such as a radio or television cabinet made according to the invention has good acoustical properties.

What is claimed is:

1. A process for the manufacture of a hinged article comprising at least two members each having a core of a foamed thermoplastic polymeric material integrally formed with solid surface layers of a non-foamed thermoplastic polymeric material and each member being joined to at least one other foam cored member by an integrally formed hinge of substantially non-foamed material comprising:

(A) injecting an unfoamable injection mouldable thermoplastic polymeric material into a mould cavity provided with a pair of opposed mould surfaces against which the desired non-foamed surface layers are to be moulded, (B) subsequently, but before the central portion of the non-foamable thermoplastic polymeric material has set, injecting a foamable injection-mouldable thermoplastic polymeric composition containing a blowing agent and a thermoplastic polymeric material into the unfoamable thermoplastic polymeric material to substantially fill the mould cavity, said foamable composition being at a temperature above the activation temperature of the blowing agent therein and the pressure on the foamable composition within the mould cavity being such that foaming is substantially prevented, (C) subsequently enlarging the volume of the mould cavity by causing a predetermined amount of relative movement between said opposed mould surfaces to allow the substantially unfoamed foamable composition containing the blowing agent within the unfoamed material to foam, and, during said mould cavity enlargment step, forming the non-foamed hinge by effecting controlled relative movement between a hinge defining mould component, positioned along the desired line of the hinge, and one of said opposed mould surfaces in such a direction so as to decrease the ratio of the distance between the hinge defining mould component and the other of said opposed mould surfaces to the distance between said two opposed mould surfaces, thereby preventing foaming of any foamable composition along the line of the desired hinge, and (D) maintaining the composition within the enlarged mould cavity for sufficient time to allow the thermoplatic materials to set.

2. A process for the manufacture of a hinged article comprising at least two members each having a core of a foamed thermoplastic polymeric material integrally formed with solid surface layers of a non-foamed thermoplastic polymeric material and each member being joined to at least one other foam cored member by an integrally formed hinge of substantially non-foamed material comprising:

(A) injecting an unfoamable injection mouldable thermoplastic polymeric material selected from the group consisting of polypropylene, polyamides, polycarbonates, acrylonitrile-butadiene-styrene copolymer, polyacetals, polyphenylene oxides, polysulphones, polyvinyl chloride, polyethylene and polymethyl methacrylate into a mould cavity provided with a pair of opposed mould surfaces against which the desired non-foamed surface layers are to be moulded, (B) subsequently, but before the central portion of the non-foamable thermoplastic polymeric material has set, injecting a foamable injection-mouldable thermoplastic composition containing a blowing agent and a thermoplastic polymeric material selected from the group consisting of polypropylene, polyamides, polycarbonates, acrylonitrile-butadiene-styrene copolymer, polyacetals, polyphenylene oxides, polysulphones, polyvinyl chloride, polyethylene and polymethyl methacrylate into the unfoamable thermoplastic polymeric material to substantially fill the mould cavity, said foamable composition being at a temperature above the activation temperature of the blowing agent therein and the pressure on the foamable composition within the mould cavity being such that foaming is substantially prevented, (C) subsequently enlarging the volume of the mould cavity by causing a predetermined amount of relative movement between said opposed mould surfaces to allow the substantially unfoamed foamable composition containing the blowing agent within the unfoamable material to foam, and, during said mould cavity enlargement step, forming the non-foamed hinge by effecting controlled relative movement between a hinge defining mould component, positioned along the desired line of the hinge, and one of said opposed mould surfaces in such a direction so as to decrease the ratio of the distance between the hinge defining mould component and the other of said opposed mould surfaces to the distance between said two opposed mould surfaces, thereby preventing foaming of any foamable composition along the line of the desired hinge, and (D) maintaining the composition within the enlarged mould cavity for sufficient time to allow the thermoplastic materials to set.

3. A process as claimed in claim 2 in which, during the mould cavity enlargement step, the hinge defining mould component is forced against the non-foamed surface layers formed against the opposed mould surfaces whereby foaming along the line of the hinge is substantially prevented while the foamable core between the non-foamed surface layers is permitted to foam in the regions on either side of the said hinge definig mould component.

4. A process as claimed in claim 3 in which the hinge defining mould component is maintained at a temperature below the activation temperature of the blowing agent.

5. A process as claimed in claim 2 wherein the relative movement between the hinge defining mould component and said one opposed mould surface is effected by the predetermined movement of the opposed mould surfaces away from each other.

References Cited
UNITED STATES PATENTS

| | | | |
|---|---|---|---|
| 3,401,217 | 9/1968 | Burwell | 264—45 |
| 3,007,209 | 11/1961 | Roberts | 264—55 |
| 3,222,437 | 12/1965 | Schilling | 264—54 X |
| 3,531,553 | 9/1970 | Bodkins | 264—54 X |
| 2,996,764 | 8/1961 | Ross | 264—328 X |
| 3,378,612 | 4/1968 | Dietz | 264—54 X |

ROBERT F. WHITE, Primary Examiner

J. B. LOWE, Assistant Examiner

U.S. Cl. X.R.

161—102, 161; 264—51, 241, 328, DIG. 4, DIG. 83